(12) United States Patent
Nakiri et al.

(10) Patent No.: US 7,722,969 B2
(45) Date of Patent: May 25, 2010

(54) MAGNETIC TAPE

(75) Inventors: Kazuhiko Nakiri, Ibaraki (JP); Sadamu Kuse, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 732 days.

(21) Appl. No.: 11/107,914

(22) Filed: Apr. 18, 2005

(65) Prior Publication Data

US 2005/0271903 A1 Dec. 8, 2005

(30) Foreign Application Priority Data

Apr. 19, 2004 (JP) ............................ P2004-122508

(51) Int. Cl.
*G11B 5/716* (2006.01)
(52) U.S. Cl. .................. 428/840.4; 428/840.6; 427/131
(58) Field of Classification Search ........................ None
See application file for complete search history.

(56) References Cited

U.S. PATENT DOCUMENTS

| | | | |
|---|---|---|---|
| 2001/0024741 A1 | 9/2001 | Ochi et al. | |
| 2004/0185227 A1 | 9/2004 | Ochi et al. | |
| 2005/0100763 A1 | 5/2005 | Ochi et al. | |

FOREIGN PATENT DOCUMENTS

| JP | 61-178723 A | 8/1986 |
|---|---|---|
| JP | 64-1297 B | 1/1989 |
| JP | 2-101624 A | 4/1990 |
| JP | 3-17827 A | 1/1991 |
| JP | 3-216812 A | 9/1991 |
| JP | 3-295022 A | 12/1991 |
| JP | 4-19815 A | 1/1992 |
| JP | 5-234063 A | 9/1993 |
| JP | 6-25702 A | 2/1994 |
| JP | 6-139553 A | 5/1994 |
| JP | 7-60504 B | 6/1995 |
| JP | 8-235566 A | 9/1996 |
| JP | 9-7164 A | 1/1997 |
| JP | 10-134337 A | 5/1998 |
| JP | 2000-123355 A | 4/2000 |
| JP | 2001-118237 A | 4/2001 |
| JP | 2001-184627 A | 7/2001 |
| JP | 2001-202613 A | 7/2001 |
| JP | 2002-25038 A | 1/2002 |
| JP | 2002-269727 A | 9/2002 |
| JP | 2003-296921 A | 10/2003 |

OTHER PUBLICATIONS

Machine translation of JP 07-296366, Japan, Nov. 1995.*
CAS Registry No. 3370-35-2, 2009, STN Registry database.*
CAS Registry No. 124-26-5, 2009, STN Registry database.*

* cited by examiner

*Primary Examiner*—Holly Rickman
(74) *Attorney, Agent, or Firm*—Birch, Stewart, Kolasch & Birch, LLP

(57) ABSTRACT

A magnetic tape comprising a non-magnetic support, a primer layer formed on one surface of the support, a magnetic layer formed on the primer layer, and a back layer formed on the other surface of the support, in which the tape has a total thickness of 4.0 to 5.4 μm, at least one of the primer layer and the magnetic layer contains a fatty acid amide, and an amount of the fatty acid amide extracted from the side of the magnetic layer with n-hexane is from 0.5 to 1.5 mg/cm$^3$.

7 Claims, No Drawings

MAGNETIC TAPE

This application claims priority to Japanese Patent Application No. 2004-122508, which is herein incorporated by reference in its entirety.

FIELD OF THE INVENTION

The present invention relates to a magnetic tape. In particular, the present invention relates to a magnetic tape which has a high recording capacity and good reliability and durability with keeping sufficient electromagnetic conversion characteristics, and which is suitably used for backup of data of a computer.

PRIOR ART

Magnetic tapes have found various applications in audio tapes, videotapes, computer tapes, etc. In particular, in the field of magnetic tapes for data-backup, tapes with recording capacities of several tens to several hundreds GB per reel are commercialized in association with the increasing capacities of hard discs for back-up. In future, it will be indispensable for such a backup tape to have a higher recording capacity to correspond to the further increase of the capacities of the hard discs.

Since such magnetic tapes are interchangeable recording media, they are used under wide variety of circumstances. Therefore, they will be required to have good reliability for data storage, and also for performances such as stable recording and reproducing of data in the case of continuous running of tapes at a high speed.

To realize magnetic tapes having a high recording capacity per reel, it is necessary to improve the contact of a magnetic tape with a head through the optimization of mechanical properties of a non-magnetic support, a primer layer and a magnetic layer as well as to increase a recording density (i.e. the reduction of a recording wavelength and a track width) by the improvement of a magnetic layer via the increase of magnetic characteristics and dispersibility of ferromagnetic powder, and the recording capacity by the elongation of a tape length per reel through the reduction of a total thickness of the tape.

In connection with the improvement of the magnetic characteristics of the ferromagnetic powder, the larger residue of a magnetization in a magnetic layer is more desirable for the increase of an output. Therefore, ferromagnetic iron metal powder has been predominantly used in place of conventional oxide magnetic powder or cobalt-containing iron oxide magnetic powder, and new ferromagnetic metal powder having a coercive force of at least 120 kA/m (1,500 Oe) is proposed (for example, JP-A-6-25702, JP-A-6-139553, etc.).

To improve the dispersibility of the ferromagnetic powder, the following methods are proposed: a binder having a polar functional group such as a sulfonic acid group, a phosphoric acid group or an alkali metal salt of these acid groups is used; a dispersant having a low molecular weight is used in combination with a binder; the step of kneading and dispersing a magnetic coating composition is continuously carried out; a lubricant is added after the dispersion; and so on (for example, JP-A-2-101624, JP-A-3-216812, JP-A-3-17827, JP-A-8-235566, etc.).

For the reduction of the total thickness of a magnetic tape, it is effective to decrease the thickness of a non-magnetic support which has the largest thickness among the layers constituting the magnetic tape. However, when the thickness of the non-magnetic support is decreased, the stiffness of the magnetic tape decreases so that the stability of the contact of the tape to a head is worsened and thus the sufficient output and the stable running of the tape cannot be maintained.

For the improvement of the contact of a magnetic tape to a head and for the decrease of a spacing loss between the tape and the head, it is proposed to improve the dispersibility of magnetic powder in a magnetic layer and also to smoothening a magnetic layer in a calendering step under high temperature-high pressure conditions (for example, JP-B-64-1297, JP-B-7-60504, JP-A-4-19815, etc.).

Besides the improvement of the properties of the magnetic layer, to provide a magnetic recording medium having a structure suitable for short wavelength recording, it is proposed to provide a primer layer between a non-magnetic support and a magnetic layer so as to decrease the thickness of the magnetic layer to 0.6 μm or less (for example, JP-A-5-234063). In the case of this magnetic recording medium, the primer layer is provided to decrease the self-demagnetization loss and reproduction loss caused by the decrease of the thickness of the magnetic layer and also to suppress the deterioration of the running properties and durability caused by the decrease of the thickness of the magnetic layer.

By the way, the recent development of recording systems further accelerates the shortening of recording wavelengths. For example, the recent model of a digital data storage system can record signals with the shortest wavelengths of 0.3 μm or less. In general, as the thickness of a magnetic layer increases, the filling amount of a magnetic powder per unit area increases, and in turn an output increases. However, when the ratio of the thickness of a magnetic layer to a recording wavelength exceeds a certain value, a demagnetization field increases and the output does not increase further. Therefore, it is necessary to decrease the thickness of a magnetic layer to about one third or less of the shortest recording wavelength. This means that, with the above-described recording systems, the magnetic layer should be designed to have a very thin thickness such as 0.3 μm or less, and the surface smoothness of the magnetic layer should be improved.

Under such circumstances, the following proposals have been made.

JP-A-10-134337 discloses a magnetic recording medium, which uses an aromatic polyamide or polyimide having high rigidity as a material of a non-magnetic support to improve head contact and thus achieve a high output, while suppressing the shrinkage of the medium, for example, a magnetic tape in the machine direction to prevent the decrease of the output.

JP-A-2002-269727 discloses magnetic recording medium comprising a non-magnetic support which has a thickness of 2.5 to 4.0 μm and a Young's modulus in a machine direction ($E_{MD}$) of 700 to 1,500 kg/mm$^2$, in which a ratio of $E_{MD}$ to a Young's modulus in its transverse direction ($E_{TD}$) is from 0.5 to 0.9 ($0.5 \leq E_{MD}/E_{TD} \leq 0.9$). Thereby, the electromagnetic conversion characteristics and running durability of the medium are improved.

JP-A-2001-202613 discloses a magnetic recording medium comprising a non-magnetic layer which contains a fatty acid, a fatty acid amide and/or a fatty acid ester to improve the durability of the medium and suppress the sticking of the medium to a head.

JP-A-2001-118237 discloses a magnetic recording medium comprising a magnetic layer which contains a fatty acid, a fatty acid amide and a fatty acid ester in a total amount of 1 to 3% by weight based on the weight of magnetic powder in the magnetic layer with the amount of the fatty acid amide being 5 to 20% by weight based on the total weight of the fatty acid, fatty acid amide and fatty acid ester, to achieve the good durability and storage properties of the medium, to avoid the sticking of the medium to a head and to suppress the deterioration of an output in a low-humidity environment.

JP-A-2002-025038 discloses a magnetic recording medium containing a fatty acid, a fatty acid ester and an alkanol fatty acid amide in a non-magnetic layer and/or a magnetic layer, which medium has good lubrication effects under a wide variety of temperature conditions, suppressed sticking to a head and improved running durability.

JP-A-2003-296921 discloses a magnetic recording medium comprising a lower non-magnetic layer and an upper magnetic layer having a thickness of 0.2 μm or less on the lower non-magnetic layer, in which the lower non-magnetic layer contains an acicular water-containing iron oxide powder as a non-magnetic powder and also a fatty acid and a fatty acid amide as lubricants.

JP-A-2000-123355 discloses a magnetic recording medium which restricts the thickness of a magnetic layer including an intermediate layer and also a ratio of stiffness in a transverse direction to one in a machine direction to improve the interchangeability of head touch.

However, in the case of magnetic recording media having a high recording capacity, in particular, thin magnetic recording media having a total thickness of 5.4 μm or less, it is difficult for the conventional magnetic recording medium to keep the reliability and durability under a wide variety of conditions, in particular, under high temperature-low humidity conditions while maintaining good electromagnetic conversion characteristics. A recording system with a high capacity requires long time recording and reproduction for backing up of a large capacity of data. In such a case, an error rate increases after long-time running of the medium, although an error rate is small at the beginning of running. In particular, the increase of the error rate is remarkable under high temperature-low humidity conditions. Thus, the contact of the media to a head deteriorates so that the error rate often increases.

Furthermore, with the most recent model of a high capacity recording system, lower-level format magnetic tapes with a smaller capacity, that is, a larger thickness are interchangeably used with higher-level format magnetic tapes with a larger capacity, that is, a smaller thickness, since such a model has backward compatibility. However, when the higher-level format tape is run after the lower-level format tape is run for a long time with such a most recent model of a high capacity system, an envelope wave form is deformed to cause the decrease of an average output and the increase of an error rate, which are newly found phenomena. Thus, it is highly desired to attain the further reliability in the case of tape-type interchanging.

SUMMARY OF THE INVENTION

Thus, an object of the present invention is to provide a coating-type magnetic tape having good electromagnetic conversion characteristics and also good reliability and durability as well as improved tape-type interchangeability, when the tape has a large capacity and a reduced total thickness.

Accordingly, the present invention provides a magnetic tape comprising a non-magnetic support, a primer layer formed on one surface of said support and containing a non-magnetic powder and a binder, a magnetic layer formed on said primer layer and containing a magnetic powder and a binder, and a back layer formed on the other surface of said support, wherein said tape has a total thickness of 4.0 to 5.4 μm, at least one of said primer layer and said magnetic layer contains a fatty acid amide, and an amount of the fatty acid amide extracted from the side of the magnetic layer with n-hexane is from 0.5 to 1.5 mg/cm$^3$.

DETAILED DESCRIPTION OF THE INVENTION

The inventors focused attention on the state of the surface of a magnetic layer which is in sliding contact with a magnetic head and the state of the magnetic head after running of the magnetic tape to suppress the increase of an error rate in the course of repeated running of a thin magnetic tape in high temperature-low humidity environments.

It is known that since a thin magnetic tape has lower stiffness than a thick magnetic tape, the former is not sufficiently in contact with the magnetic head so that a spacing loss increases near a head gap. Furthermore, when the head contact is closely observed during the running of the tape, it is found that the thin magnetic tape runs with the both edges of the sliding surface being in strong contact with the magnetic head. In addition, stains (brawn stains) firmly adhere to the sliding surface of the head and they are assumed to be causes for the increase of an error rate.

The surface of a magnetic layer is macroscopically very smooth, while it is microscopically uneven due to protrusions and dents, and the magnetic tape is in contact with the magnetic head at such microscopic protrusions.

The present inventors assumed that, in the case of a thin magnetic tape, excessive force may be applied to the projections on the edges of a sliding surface of a tape so that the projections may drop off and the dropped materials may adhere and accumulate onto the head to stain the head. Then, the present inventors had an idea that if the sliding contact between the thin magnetic tape and the magnetic head is eased, the contamination of the head decreases, and thus the increase of the error rate is suppressed, and they continued the investigation and had the following findings:

Firstly, the present inventors focused attention on the components of lubricants to ease the sliding contact between a magnetic tape and a magnetic head. Heretofore, to decrease the friction between the magnetic tape and the magnetic head or other contacting members, a lubricant such as a fatty acid or a fatty acid ester is added to a primer layer and a magnetic layer so that the lubricant exudes from the inside to the surface of the magnetic layer. Since the fatty acid is easily adsorbed on the magnetic powder and non-magnetic powder, it hardly exudes from the primer layer to the surface of the magnetic layer. However, the fatty acid ester, which is not adsorbed on the magnetic powder and non-magnetic powder and is in the free state, easily migrates onto the surface of the magnetic layer because of its chemical structure.

However, in a low-humidity environment, the amount of moisture at the interface between the magnetic head and the magnetic tape is low, and furthermore the number of hydrophilic groups present on the coating surface is small. Therefore, the magnetic tape has a low function to trap moisture, so that the cushioning or buffering effect in the sliding area decreases in comparison with that in a high-humidity environment. In addition, since the thin magnetic tape has low stiffness, a contact pressure at the edges of the sliding surface extremely increases. Accordingly, in the case of the conventional magnetic tapes, the film of the lubricant tends to break or to have insufficient strength, so that the cushioning effects become insufficient. In addition, since the film strength of the lubricant decreases in the high-temperature environment, the breakage of the lubricant film and the drop off of the lubricant component may be accelerated, and the dropped materials may adhere to the magnetic head and thus the error rate may be worsened.

The present inventors screened lubricants to select one having a cushioning effect on the sliding part of a magnetic tape in a low-temperature environment, and found that a fatty acid amide is particularly effective. Also, the present inventors found that a preferable amount of the fatty acid amide is 0.5 to 1.5 mg/cm$^3$ in terms of an extracted amount from the coating layer (magnetic layer+primer layer) of the magnetic tape with n-hexane.

Roughly speaking, the fatty acid amide is (1) present in the voids in the coating layer, (2) dissolved in a binder, or (3) adsorbed to powders, and the most of the fatty acid is (1) present in the voids in the coating layer and (2) dissolved in a binder. However, since the solubility of the fatty acid amide in an organic solvent is low because of its chemical properties, the existence states of the fatty acid amide have not been able to be confirmed by an extraction method. Therefore, only the compounding amount of the fatty acid amide in the coating layer has been defined, but the amount of the fatty acid amide in the coating layer has not been discussed in terms of an extracted amount thereof.

However, if the compounding amount is defined, the existence states of the fatty acid amide change in the coating layer depending on the timing of addition or the time of dispersing in the preparation of a coating composition of the coating layer. In addition, since the fatty acid amide has a small solubility in an organic solvent as explained above, a part of the undissolved fatty acid amide may be trapped with a filter in the filtrating step during the preparation of the coating composition. For these reasons, the relationship between the compounding amount and the extracted amount of the fatty acid amide cannot be uniquely determined.

Then, the present inventors studied an extraction method for a fatty acid amide, and found that the fatty acid amide contained in the voids in the coating layer can be extracted with n-hexane, when an ultrasonic wave is applied to a sample during extraction with n-hexane. The ultrasonic wave is preferably applied at 25° C. for 30 minutes.

The fatty acid amide was extracted from the coating layer of the magnetic tape by the extraction method described above, and then the correlation of the existing states of the fatty acid amide and the increase of an error rate was studied. Accordingly, it was found that the amount of the fatty acid amide present in the voids in the coating layer, that is, the amount of the fatty acid amide extracted with n-hexane has a correlation with the increase of an error rate.

Consequently, when the extracted amount of a fatty acid amide with n-hexane from the unit volume of the coating layer (magnetic layer+primer layer) is adjusted in a range of 0.5 to 1.5 mg/cm$^3$, preferably in a range of 0.8 to 1.2 mg/cm$^3$, a magnetic tape has the suppressed increase of an error rate when it is run in a high temperature-low humidity environment.

When the extracted amount of the fatty acid amide is less than 0.5 mg/cm$^3$, the sufficient cushioning effect at the sliding surface of the tape may not be attained. When the extracted amount of the fatty acid amide exceeds 1.5 mg/cm$^3$, the excessive fatty acid amide may adhere to the magnetic head and thus the error rate may increase during the running of the tape.

Herein, the extracted amount of the fatty acid amide is defined by an amount of the fatty acid amide extracted from a unit volume of the coating layer rather than that from a unit surface area of the coating layer. This is because the amount of the fatty acid amide extracted from a unit volume of the coating layer has a closer correlation with the durability of the magnetic tape than that from a unit surface area of the coating layer from the viewpoint that the required amount of the lubricant is supplied neither too much nor too little to the tape surface during running. That is, the present invention can provide a magnetic tape which does not suffer from the increase of an error rate during running in the high temperature-low humidity environment by controlling the extracted amount of the fatty acid amide in the above range.

The extracted amount of the fatty acid amide can be controlled by the selection of the kind and amount of a fatty acid amide used, the adjustment of a dispersing time after the addition of a fatty acid amide to a coating composition, the selection of a timing to add a fatty acid amide to a coating composition, the selection of a fatty acid amide having a suitable compatibility with a binder, the adjustment of the porosity of a coating layer, the selection of drying conditions in the coating process of the coating composition, etc. These factors may be used independently or in combination. Of course, any other conventional method may be used.

A fatty acid amide used in the present invention preferably has a melting point of 70° C. or higher. Preferable examples of such a fatty acid amide include lauric acid amide, myristic acid amide, palmitic acid amide, stearic acid amide, oleic acid amide, etc. When the fatty acid amide has a melting point of 70° C. or higher, the film strength of the lubricant at a high temperature can be increased and thus the cushioning effect against the sliding contact between the magnetic tape and the magnetic head can be improved.

The fatty acid amide may be added to at least one of the primer layer and the magnetic layer, preferably added to at least the magnetic layer, since the fatty acid amide can smoothly migrates to the surface of the coating layer and the cushioning effect can be further improved.

To add the fatty acid amide to a non-magnetic paint for a primer layer or a magnetic paint for a magnetic layer, the fatty acid amide is preferably beforehand dispersed in an organic solvent using a media-type disperser such as a ball mill, a sand grinder, etc., or an ultrasonic disperser, and then the dispersion is added to the paint. Thereby, the fatty acid amide can be uniformly distributed throughout the coating layer and thus the lubrication function can be enhanced.

After the addition of the fatty acid amide to the paint, the paint is preferably dispersed with a media-type disperser such as a sand mill. That is, the fatty acid amide is preferably added before the dispersing treatment of the paint. Thereby, the fatty acid amide is more uniformly distributed throughout the coating layer.

In the case of a conventional magnetic tape comprising a magnetic layer with a thickness of 0.5 μm or more, the dispersing of the magnetic paint after the addition of the fatty acid has no influence on the contamination of the head. However, in the case of a magnetic tape comprising a magnetic layer with a thickness of 0.3 μm or less, the dispersing of the magnetic paint containing the fatty acid amide has a favorable influence on the contamination of the head.

A fatty acid amide has a poor compatibility with a binder and forms domains in the binder. Therefore, the fatty acid amide does not migrate to the surface of the magnetic layer and has no effective contribution to the improvement of durability. If no dispersing of the paint is carried out after the addition of the fatty acid amide, a ratio of a domain size to the thickness of the magnetic layer increases so that the contact force between the tape and the head cannot sufficiently diffuse, and the breakage of the lubricant film may increase to contaminate the head.

The present inventors further investigated the tape-type interchangeable property of magnetic tapes and found that, besides the control of the extracted amount of the fatty acid amide, a magnetic tape having the following stiffness can improve this property:

That is, $E_{TD} \cdot t^3$ is at least $2.0 \times 10^{-6}$ N·m and $E_{MD}/E_{TD}$ is larger than 0.5 and less than 0.9, wherein $E_{MD}$ and $E_{TD}$ are the Young's moduli (unit: Pa) of a magnetic tape in the machine and transverse directions of the magnetic tape, respectively and t is a thickness (unit: μm) of the magnetic tape.

When the $E_{TD} \cdot t^3$ value is within the above range, the magnetic tape stably runs and the head contact of the magnetic tape is made better and therefore the tape-type interchanging property is improved. The larger $E_{TD} \cdot t^3$ is more preferable, but the upper limit of $E_{TD} \cdot t^3$ is about $4.0 \times 10^{-6}$ N·m for currently available materials.

When the $E_{MD}/E_{TD}$ ratio is within the above range, the tape-type interchanging property is improved, and the fluctuation of reproduction output (flatness) is decreased, as the magnetic head enters from the entry side of a tape track and reaches the exit side of the tape track.

The magnetic tape having a thickness and Young's moduli $E_{MD}$ and $E_{TD}$, which satisfy the above relationships, can prevent the deformation of the envelope wave form and the deterioration of the output and the error rate, even when the higher-level format tape having a smaller thickness is run after the lower-level format tape having larger thickness is run for a long time.

The present invention also provides a method for producing a magnetic tape of the present invention, which comprises a non-magnetic support, a primer layer formed on one surface of the support and containing a non-magnetic powder and a binder, a magnetic layer formed on the primer layer and containing a magnetic powder and a binder, and a back layer formed on the other surface of the support. This method uses a non-magnetic coating composition (non-magnetic paint) of a primer layer and a magnetic coating composition (magnetic paint) for a magnetic layer, at least one of which contains a fatty acid amide.

In particular, the method of the present invention is characterized in that, when the fatty acid amide is added to at least one of the non-magnetic coating composition and the magnetic coating composition, the fatty acid amide is firstly dispersed in an organic solvent and then the dispersion of the fatty acid amide is added to at least one of the coating compositions, or the fatty acid amide is added to at least one of the coating compositions prior to the dispersing treatment of the coating compositions, that is, the coating compositions are dispersed after the addition of the fatty acid amide.

Hereinafter, the components of the magnetic tape of the present invention will be described in more detail.

<Non-Magnetic Support>

In the present invention, a tape-form non-magnetic support is used.

The Young's modulus of the non-magnetic support in the machine direction is preferably at least 9.8 GPa (1,000 kg/mm²), and the ratio of the Young's modulus in the machine direction to one in the transverse direction is preferably 0.5 to 0.9. More preferably, the Young's modulus of the non-magnetic support in the machine direction is at least 10.78 GPa (1,100 kg/mm²), the ratio of the Young's modulus in the machine direction to one in the transverse direction is 0.67 to 0.73.

When the Young's modulus of the non-magnetic support in the machine direction is less than 9.8 GPa (1,000 kg/mm²), the running of the tape is unstable. When the ratio of the Young's modulus in the machine direction to one in the transverse direction is less than 0.5 or larger than 0.9, the flatness increases. The flatness is minimized when the ratio of the Young's modulus in the machine direction to one in the transverse direction is around 0.70.

Preferable examples of the non-magnetic support which satisfies the above requirements include a biaxially stretched film of aromatic polyamide, aromatic polyimide, etc. Other polymer films which satisfy the above characteristics may be used.

The thickness of the non-magnetic support may vary depending on the end use of the magnetic tape, and it is generally 2 to 5 μm, preferably 2.5 to 3.8 μm. When the thickness of the non-magnetic support is less than 2 μm, it is difficult to form a film for the support, and the strength of the resultant magnetic tape tends to lower. When the thickness of the non-magnetic support exceeds 5 μm, the total thickness of the magnetic tape increases, so that the recording capacity per reel decreases.

<Primer Layer>

A magnetic layer is formed on one surface of the non-magnetic support explained above. Between the support and the magnetic layer, a primer layer containing a non-magnetic powder and a binder is provided to buffer the head contact of the magnetic tape with a magnetic head and to control the head touch.

The primer layer comprises at least one layer and optionally comprises two or more layers. The thickness of the primer layer is usually from 0.3 to 2.0 μm, preferably from 0.5 to 1.5 μm, from the viewpoint of the total thickness of the magnetic tape.

The non-magnetic powder to be contained in the primer layer may be any conventional non-magnetic powder. Examples of such non-magnetic powder include α-alumina, β-alumina, chromium oxide, cerium oxide, α-iron oxide, corundum, artificial diamond, silicon nitride, silicon carbide, titanium carbide, titanium oxide, silicon dioxide, boron nitride, etc. Usually, non-magnetic iron oxide is mainly used, while carbon black or aluminum oxide having a particle size of 0.1 to 0.5 μm may supplementarily be used.

The non-magnetic iron oxide preferably has a major axis length of 0.05 to 0.4 μm, more preferably 0.05 to 0.2 μm and a minor axis length of 5 to 200 nm. The amount of the non-magnetic iron oxide is preferably from 35 to 83% by weight based on the weight of based on the total weight of the non-magnetic powder in the primer layer.

When the major axis length of the non-magnetic iron oxide is less than 0.05 μm, it is difficult to homogeneously disperse the iron oxide in the primer layer. When it exceeds 0.4 μm, the roughness at the interface between the primer layer and the magnetic layer may increase. When the amount of the non-magnetic iron oxide is less than 35% by weight, the strength of the primer layer may not be sufficiently increased. When it exceeds 83% by weight, the strength of the primer layer may even decrease.

Examples of carbon black include acetylene black, furnace black, thermal black, etc. Carbon black with a particle size of 5 to 200 nm, preferably 10 to 100 nm is used. Since the particles of carbon black have their own structures, it is hard to disperse carbon black with a particle size of less than 5 nm, and the use of carbon black with a particle size of 200 nm or more degrades the smoothness of the primer layer.

The amount of carbon black added depends on the particle size of the carbon black. The amount of carbon black is preferably from 15 to 40% by weight based on the total weight of the non-magnetic powder in the primer layer. When the amount of carbon black added is less than 15% by weight, the electric conductivity-improving effect is poor. When it exceeds 40% by weight, this effect is saturated. The use of 15 to 35% by weight of carbon black with a particle size of 15 to 80 nm is preferable, and the use of 20 to 30% by weight of carbon black with a particle size of 20 to 50 nm is more preferable. The addition of the above amount of carbon black with the above particle size is effective to lower the electric resistance and to reduce static noises and fluctuation in tape-running.

As the binders to be contained in the primer layer, there can be used a combination of a polyurethane resin with at least one resin selected from the group consisting of vinyl chloride resins such as a polyvinyl chloride resin, a vinyl chloride-vinyl acetate copolymer, a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, and cellulose resins such as nitrocellulose. Among them, a combination of a vinyl chloride-hydroxyl group-containing alkyl acrylate copolymer with a polyurethane resin is preferred. Examples of the polyurethane resin include polyesterpolyurethane, polyetherpolyurethane, polyetherpolyesterpolyurethane, polycarbonatepolyurethane, polyestrepolycarbonate-polyurethane, etc.

Preferably, the binder comprises a polymer having, as a functional group, —COOH, —SO$_3$M, —OSO$_3$M, —P=O(OM)$_3$, —O—P=O(OM)$_2$ [wherein M is a hydrogen atom, an alkali metal base or an amine salt], —OH, —NR$^1$R$^2$, —N$^+$R$^3$R$^4$R$^5$ [wherein R$^1$, R$^2$, R$^3$, R$^4$ and R$^5$ are, each independently a hydrogen atom or a hydrocarbon group], or an epoxy group. Such a binder can improve the dispersibility of the non-magnetic powder. When two or more resins are used in combination, preferably the polarities of the functional groups of the resins are the same. In particular, the combination of resins both having —SO$_3$M groups is preferable.

The amount of the binder is preferably from 7 to 50% by weight, more preferably from 10 to 35% by weight based on the total weight of the solid components in the primer layer. When the amount of the binder is less than 7% by weight, the dispersibility of the non-magnetic powder in the primer layer deteriorates. When the amount of the binder exceeds 50% by weight, the relative amount of the binder to the non-magnetic powder is excessive and thus the amount of the binder which is not adsorbed on the non-magnetic powder increases, so that the volume of the voids in the primer layer deceases and the cushioning effect of the primer layer deteriorates.

In the most preferable embodiment, 5 to 20% by weight of the vinyl chloride resin and 2 to 20% by weight of the polyurethane resin are used in combination, since the strength and the dispersing property for the non-magnetic powder of the vinyl chloride resin and the flexibility of the polyurethane resin are both utilized.

Preferably, the binder is used in combination with a thermally curable crosslinking agent which bonds with the functional groups in the binder to crosslink the binder molecules. Preferable examples of the thermocurable crosslinking agent include isocyanates such as tolylene diisocyanate, hexamethylene diisocyanate, and isophorone diisocyanate; and polyisocyanates such as reaction products of these isocyanates with compounds each having a plurality of hydroxyl groups such as trimethylolpropane, and condensation products of these isocyanates. The crosslinking agent is used usually in an amount of 1 to 30 parts by weight, preferably 5 to 20 parts by weight, based on 100 parts by weight of the binder. When the amount of the crosslinking agent is less than 1 part by weight, the crosslinking effect may decrease. When it exceeds 30 parts by weight, the amount of the uncrosslinked low molecular weight components in the primer layer increases. In either case, the stiffness of the primer layer decreases.

Preferably, the Young's modulus of the coating layer which comprises a lamination of the primer layer and the magnetic layer is 40 to 150%, more preferably 50 to 120%, particularly preferably 60 to 90% of an average value of the Young's moduli of the non-magnetic support in the machine and transverse directions. When the Young's modulus of the coating layer is controlled within this range, the durability of the magnetic tape is improved and the touch of the magnetic tape to the head is improved. Furthermore, the flatness is improved. When the Young's modulus of the coating layer is less than 40% of the average value of the Young's moduli of the non-magnetic support in the machine and transverse directions, the durability of the coating layer becomes poor. On the other hand, when it exceeds 150% of the same, the touch of the magnetic tape to the head is worsened.

The Young's modulus of the primer layer is preferably 80 to 99% of the Young's modulus of the magnetic layer, since the primer layer can function as a cushion.

To control the Young's moduli of the coating layer comprising the primer layer and the magnetic layer, a method of controlling the Young's moduli by changing the calendering conditions may preferably be employed in the present invention.

In one embodiment of the present invention, the primer layer can contain a lubricant which has different functions from one contained in the magnetic layer. Preferably, the primer layer contains 0.5 to 4.0% by weight of a higher fatty acid and 0.2 to 3.0% by weight of a higher fatty acid ester based on the total weight of the powder components contained in the primer layer. This is because the coefficient of friction of the magnetic tape against a rotating cylinder can be decreased. When the amount of the higher fatty acid is less than 0.5% by weight, the effect to decrease the coefficient of friction is insufficient. When the amount of the higher fatty acid exceeds 4.0% by weight, the primer layer may be plasticized and thus the toughness of the non-magnetic layer may be lost. When the amount of the higher fatty acid ester is less than 0.2% by weight, the effect to decrease the coefficient of friction is insufficient. When the amount of the higher fatty acid ester exceeds 3.0% by weight, the amount of the higher fatty acid ester which migrates to the magnetic layer becomes too large, so that the magnetic tape may stick to the head. If desired, the primer layer may additionally contain the fatty acid amide similar to one contained in the magnetic layer.

<Magnetic Layer>

The magnetic layer, which is formed on the primer layer, comprises a binder and magnetic powder dispersed in the binder, and the magnetic layer comprises at least one layer, or two or more layers, if desired.

The magnetic layer preferably contains, as lubricants, a fatty acid amide in an amount larger than 0.6% by weight and not larger than 3.0% by weight and a higher fatty acid ester in an amount of 0.2 to 3.0% by weight, since the coefficient of friction of the magnetic tape against a rotating cylinder can be decreased. In this regard, the intermigration of the lubricants between the magnetic layer and the primer layer may be allowed.

When the amount of the fatty acid amide is 0.6% by weight or less, the magnetic head and the magnetic tape tend to be in direct contact each other at their interface and the effect to prevent seizing decreases. When the amount of the fatty acid amide exceeds 3.0% by weight, the excessive fatty acid amide bleeds out at a low temperature so that some defects such as drop-outs may be caused. Examples of the higher fatty acid amide include the amides of lauric acid, palmitic acid, stearic acid, oleic acid, etc.

When the amount of the higher fatty acid ester is less than 0.2% by weight, the friction coefficient-decreasing effect is insufficient. When the amount of the fatty acid ester exceeds 3% by weight, the magnetic tape may stick to the rotating cylinder.

In the present invention, the amount of the fatty acid amide extracted with n-hexane from the unit volume of the magnetic layer and the primer layer is from 0.5 to 1.5 mg/cm$^3$. Thereby, the cushioning effect at the sliding surface of the head is effectively achieved and therefore, the increase of the error rate is prevented. When the extracted amount of the fatty acid amide is less than 0.5 mg/cm$^3$, the cushioning effect is insufficient. When the extracted amount of the fatty acid amide exceeds 1.5 mg/cm$^3$, the error rate increases since the excessive fatty acid amide adheres to the magnetic head.

The magnetic powder to be contained in the magnetic layer is preferably iron nitride magnetic powder, ferromagnetic iron-based metal powder, plate-form hexagonal barium ferrite powder, etc.

The iron nitride magnetic powder may be a conventional one, and may have a needle shape and also a spherical shape or an irregular shape such as a cube. The iron nitride magnetic powder should have a particular particle size and a particular specific surface area as described below to satisfy the properties required for magnetic recording. Therefore, suitable production conditions should be selected (see WO 03/079332). That is, such an iron nitride magnetic powder can be produced as follows:

An iron oxide powder such as $\gamma$-Fe$_2$O$_3$ or a metal-iron oxide comprising such an iron oxide powder, which has a particle size of 0.5 µm or less, is reduced in a hydrogen atmosphere and then nitrided in an atmosphere of ammonia (NH$_3$) or a mixed gas stream containing ammonia gas.

The reduction of the iron oxide powder or metal-iron oxide powder is preferably carried out in the stream of hydrogen gas at a temperature of 300 to 500° C. When the reducing temperature is less than 300° C., the oxide powder is insufficiently reduced and thus any magnetic powder having a large saturation magnetization may not be obtained after the nitriding step. When the reducing temperature exceeds 500° C., the particles may be sintered together and thus any magnetic powder having a large coercive force may not be obtained after the nitriding step.

The nitriding of the reduced powder is preferably carried out in the atmosphere of ammonia or a mixed gas stream containing ammonia gas and at least one diluent gas such as argon, hydrogen, nitrogen, etc. at a relatively low temperature of 100 to 250° C. When the nitriding temperature is too high, any Fe$_{16}$N$_2$ phase may be formed. When the nitriding temperature is too low, the formation rate of the Fe$_{16}$N$_2$ phase tend to decrease. These gases preferably have high purity (5 N or higher) or contains oxygen in an amount of several ppm.

The ferromagnetic iron-based metal magnetic powder may optionally contain at least one transition metal such as Mn, Zn, Ni, Cu, Co, etc. in the form of an alloy with iron. Among them, Co and Ni are preferable. In particular, Co is preferable since it can most effectively increase the saturation magnetization of the magnetic powder. The amount of the transition metal is preferably from 5 to 50 atomic %, more preferably from 10 to 30 atomic %, based on the amount of iron.

Furthermore, the ferromagnetic iron-based metal magnetic powder may contain at least one rare earth element selected from the group consisting of yttrium, cerium, ytterbium, cesium, praseodymium, samarium, lanthanum, europium, neodymium, terbium, etc. Among them, cerium, neodymium, samarium, terbium and ytterbium are preferable, since a high coercive force is achieved. The amount of the rare earth element is preferably from 0.2 to 20 atomic %, more preferably from 0.3 to 15 atomic %, particularly preferably from 0.5 to 10 atomic %, based on the amount of iron.

The ferromagnetic iron-based metal magnetic powder or the iron nitride magnetic powder preferably has a coercive force of 80 to 320 kA/m (1,005 to 4,021 Oe), and a saturation magnetization of 80 to 200 A·m$^2$/kg (80 to 200 emu/g), more preferably 100 to 180 A·m$^2$/kg (100 to 180 emu/g).

The above magnetic powder preferably has an average particle size of 10 to 200 nm, more preferably 10 to 150 nm. When this average particle size is less than 10 nm, the coercive force may decrease or the dispersion of the magnetic powder in the magnetic paint may be difficult since the surface energy of the particles increases. When this average particle size exceeds 200 nm, the particle noise due to the size of the powder particles increases.

Furthermore, the magnetic power preferably has a BET specific surface area of at least 35 m$^2$/g, more preferably at least 40 m$^2$/g, most preferably at least 50 m$^2$/g. Usually, the BET specific surface area does not exceed 100 m$^2$/g.

The hexagonal barium ferrite powder has a coercive force of 120 to 320 kA/m (1,508 to 4,021 Oe) and a saturation magnetization of 40 to 70 A·m$^2$/kg (40 to 70 emu/g).

The barium ferrite powder preferably has an average particle size (a size in a plane direction a plate-form particle) of 10 to 50 nm, more preferably 10 to 30 nm, particularly preferably 10 to 20 nm. When the average particle size of the magnetic powder is less than 10 nm, the particles have a large surface energy so that the dispersion of the particles in the paint becomes difficult. When the average particle size of the magnetic powder exceeds 50 nm, the particle noise due to the size of the particles increases.

A plate ratio (a ratio of a plate diameter to a plate thickness) of the barium ferrite powder is preferably from 2 to 10, more preferably from 2 to 5, particularly preferably from 2 to 4. The barium ferrite powder preferably has a BET specific surface area of 1 to 100 m$^2$/g.

The binder to be contained in the magnetic layer may be selected from the same resins as those contained in the primer layer. Among the binder resins, one having a functional group is preferable.

The amount of the binder in the magnetic layer is usually from 7 to 50% by weight, preferably from 10 to 35% by weight based on the total weight of the whole solid components including the magnetic powder. In particular, 5 to 30% by weight of the vinyl chloride resin and 2 to 20% by weight of the polyurethane resin are used in combination.

Preferably, the binder is used in combination with a thermally curable crosslinking agent, which may be the same as one used in the primer layer, in particular, polyisocyanate. The amount of the crosslinking agent in the magnetic layer is also the same as that in the primer layer.

The magnetic layer may contain a known abrasive. Examples of the abrasive include $\alpha$-alumina, $\beta$-alumina, chromium oxide, cerium oxide, $\alpha$-iron oxide, corundum, artificial diamond, silicon nitride, silicon carbide, titanium carbide, titanium oxide, silicon dioxide, boron nitride, etc. most of which have Mohs' hardness of 6 or more. Each of these abrasives may be used alone, or in combination. Above all, alumina is particularly preferable since the use of a small amount of alumina is enough to show a high head-cleaning effect because of the high hardness of alumina.

The average particle size of the abrasive depends on the thickness of the magnetic layer, and it is preferably from 20 to 400 nm, more preferably from 30 to 300 nm.

The amount of the abrasive to be added is preferably from 5 to 13% by weight, more preferably from 5 to 10% by weight based on the weight of the magnetic powder. When the amount of the abrasive is less than 5% by weight, the head-cleaning effect of the magnetic layer may decrease. When the amount of the abrasive exceeds 13% by weight, the filling rate of the magnetic powder in the magnetic layer decreases so that the output lowered.

Preferably, the abrasive is beforehand dispersed in a binder solution to from a slurry, and then the slurry is added to the magnetic paint, since the abrasion ability and the surface smoothness of the coating layer are achieved at the same time. The addition of the slurry to the magnetic paint may be carried out by one of the following two methods:

(1) After kneading of the magnetic paint, a part of the slurry containing the abrasive is added to the magnetic paint and stirred to carry out the primary dispersing step for a certain period of time. Then, the remaining slurry is added to the mixture in the secondary dispersing step and dispersed for a certain period of time.

(2) After kneading of the magnetic paint, all the slurry is added to the magnetic paint and stirred to carry out the primary dispersing for a certain period of time and then the secondary dispersing for a certain period of time.

If all the slurry is added to the magnetic paint in the kneading step, the abrasive particles are firmly adsorbed to the binder so that they hardly exist in the surface layer of the magnetic layer formed. Thus, the head-cleaning effect of the magnetic layer deteriorates. If all the slurry containing the abrasive is added to the magnetic paint after the secondary dispersing step, the dispersibility of the abrasive in the paint decreases so that the surface smoothness of the magnetic layer formed is extremely worsened so that the output decreases.

The magnetic layer of the magnetic tape of the present invention may further contain conventional carbon black for the purpose of improving the electric conductivity and the surface lubricity of the magnetic layer. As this carbon black, acetylene black, furnace black, thermal black or the like may be used. In general, carbon black with a particle size of from 5 to 200 nm is used. Further, the use of carbon black with a particle size of 10 to 100 nm is preferable. When the particle size is less than 5 nm, the dispersion of carbon black is difficult. When the particle size exceeds 200 nm, it is necessary to add a large amount of carbon black. In either case, the surface of the magnetic layer roughened, which leads to the decrease of output. The amount of carbon black is preferably 0.2 to 5% by weight, more preferably 0.5 to 4% by weight, based on the weight of the magnetic powder.

The magnetic layer preferably has a thickness of 0.02 to 0.3 μm, more preferably 0.02 to 0.25 μm. When the thickness of the magnetic layer is less than 0.02 μm, a leakage magnetic field from the magnetic layer is small, so that the output from the head decreases. When the thickness exceeds 0.3 μm, the output from the head decreases due to thickness loss.

The magnetic layer preferably has a coercive force of 135 to 280 kA/m (1,700 to 3,500 Oe), more preferably 160 to 240 kA/m (2,000 to 3,000 Oe), in the machine direction. When the coercive force of the magnetic layer is less than 135 kA/m, output from the head decreases due to a demagnetic field. When it exceeds 280 kA/m, writing on the magnetic tape with the head is difficult.

The magnetic layer preferably has a residual magnetic flux density of at least 0.18 T (1,800 G), more preferably 0.2 to 0.4 T (2,000 to 4,000 G), in the machine direction. When the residual magnetic flux density is less than 0.18 T, the output from the head decreases.

Herein, the magnetic characteristics of the magnetic layer and the magnetic powder are measured with a sample-vibration type fluxmeter under an external magnetic field of 1.273 kA/m (16 kOe).

The average particle size of the magnetic powder or other powders such as carbon black, etc. is determined by taking a photograph of particles with a transmission electron microscope at a sufficient magnification for observing the shape of each particle, measuring the largest particle size (a major axis length in case of a needle-form particle) of each of 100 particles, and then number averaging the measured particle sizes of 100 particles.

<Back Layer>

To improve the tape-running property, a back layer is formed on the other surface of the non-magnetic support, that is, the surface of the non-magnetic support opposite the surface carrying the primer layer and the magnetic layer thereon.

The thickness of the back layer is preferably from 0.2 to 0.8 μm. When the thickness of the back layer is less than 0.2 μm, the effect to improve the tape-running property is insufficient. When the thickness of the back layer exceeds 0.8 μm, the total thickness of the magnetic tape increases, so that the recording capacity per one reel of the tape decreases. Usually, the back layer containing a non-magnetic powder and a binder is used, while other back layer which can improve the tape-running property may be used.

The back layer preferably contain iron oxide or alumina particles having an average particle size of 0.1 to 0.6 μm, more preferably 0.2 to 0.5 μm to increase the strength of the back layer. The amount of the iron oxide or alumina particles is preferably from 2 to 40% by weight, more preferably 5 to 30% by weight based on the total weight of inorganic powders in the back layer.

Generally, carbon black is used as a non-magnetic powder contained in the back layer. As the carbon black, acetylene black, furnace black, thermal black or the like can be used. In a preferred embodiment, carbon black with a small particle diameter and carbon black with a large particle diameter are used in combination. The particle diameter of the small particle diameter carbon black is from 5 to 200 nm, preferably from 10 to 100 nm. When the particle diameter of the small particle diameter carbon black is less than 10 nm, the dispersion of such carbon black is difficult. When the particle diameter of the small particle diameter carbon black exceeds 100 nm, such carbon black must be added in a large amount. In either case, the surface of the back layer becomes coarse and thus the surface roughness of the back layer may be transferred to the reverse side of the magnetic layer (embossing).

When, together with the small particle diameter carbon black, the large particle diameter carbon black having a particle diameter of 200 to 400 nm is used in an amount of 5 to 15% by weight based on the weight of the small particle diameter carbon black, the surface of the back layer does not become coarse, and the effect to improve the tape-running property is increased. The total amount of the small particle diameter carbon black and the large particle diameter carbon black is preferably from 60 to 98% by weight, more preferably from 70 to 95% by weight, based on the weight of the inorganic powder in the back layer. The center line average surface roughness Ra on the surface of the back layer is preferably from 3 to 8 nm, more preferably from 4 to 7 nm.

The magnetic tape of the present invention is assembled into a tape cartridge to produce a magnetic tape cartridge (or a cassette tape), which has a large recording capacity per reel and high reliability, and thus is especially excellent as a data backup tape for a hard disc drive, etc.

EXAMPLES

The present invention will be explained in detail by the following Examples, which should not be construed as limiting the scope of the present invention in any way. In Examples and Comparative Examples, "parts" are "parts by weight", unless otherwise specified, and "particle size" or "particle diameter" is "average particle size" or "average particle diameter".

Example 1

| <Components of Coating Composition of Back layer for Lapping Tape> | |
|---|---|
| Carbon black (particle size: 230 nm) | 80 parts |
| Carbon black (particle size: 25 nm) | 10 parts |
| α-Iron oxide (particle size: 100 nm) | 10 parts |
| Nitrocellulose | 45 parts |
| Polyurethane resin (containing —SO$_3$Na groups) | 30 parts |
| Cyclohexanone | 260 parts |
| Toluene | 260 parts |
| Methyl ethyl ketone | 525 parts |

The above components of the coating composition for a back layer were dispersed with a sand mill in a residence time of 45 minutes, and polyisocyanate (15 parts) was added to the mixture, stirred and filtrated to obtain the coating composition for a back layer. Then, the coating composition was applied on one surface of a polyethylene terephthalate (PET) film having a thickness of 5.0 μm ("Lumirror®" manufactured by Toray) so that a resultant back layer could have a dry thickness of 0.5 μm, and then dried to form a back layer.

| <Components of Non-magnetic Coating Composition for Lapping Tape> | |
|---|---|
| (1) | |
| Needle-form iron oxide powder (particle size: 100 nm) | 63 parts |
| Particulate alumina powder (particle size: 80 nm) | 5 parts |
| Carbon black (particle size: 25 nm) | 29 parts |
| Stearic acid | 2 parts |
| Vinyl chloride-hydroxypropyl acrylate copolymer (—SO$_3$Na group content: $0.7 \times 10^{-4}$ eq./g) | 8 parts |
| Polyester-polyurethane resin (Tg: 40° C., —SO$_3$Na group content: $1 \times 10^{-4}$ eq./g) | 5 parts |
| Cyclohexanone | 25 parts |
| Methyl ethyl ketone | 40 parts |
| Toluene | 10 parts |
| (2) | |
| Butyl stearate | 0.7 part |
| Cyclohexanone | 70 parts |
| Methyl ethyl ketone | 50 parts |
| Toluene | 20 parts |

| -continued | |
|---|---|
| <Components of Non-magnetic Coating Composition for Lapping Tape> | |
| (3) | |
| Polyisocyanate | 1.3 parts |
| Cyclohexanone | 10 parts |
| Methyl ethyl ketone | 15 parts |
| Toluene | 10 parts |

Among the above components of a non-magnetic coating composition, the components (1) were kneaded with a batch kneader, and then the components (2) were added thereto. The mixture was dispersed in a sand mill in a residence time of 60 minutes. Then, the components (3) were added to the dispersed mixture, stirred and filtrated to prepare a non-magnetic coating composition for a lapping tape.

| <Components of Magnetic Coating Composition for Lapping Tape> | |
|---|---|
| (1) - Kneading step components | |
| Ferromagnetic iron-based metal powder (Co/Fe: 20 atomic %, Y/(Fe + Co): 2.3 atomic %, Al/(Fe + Co): 8 wt. % σs: 135 A·m$^2$/kg, Hc: 150 kA/m, and particle size: 110 nm) | 100 parts |
| Vinyl chloride-hydroxypropyl acrylate copolymer (—SO$_3$Na group content: $0.7 \times 10^{-4}$ eq./g) | 11 parts |
| Polyester-polyurethane resin (—SO$_3$Na group content: $1.0 \times 10^{-4}$ eq./g) | 8 parts |
| α-alumina (particle diameter: 25 nm) | 9 parts |
| Carbon black (particle diameter: 25 nm) | 5 parts |
| Methyl acid phosphate | 1.8 parts |
| Tetrahydrofuran | 20 parts |
| Methyl ethyl ketone | 4.5 parts |
| Cyclohexanone | 4.5 parts |
| (2) - Dilution step components | |
| n-Butyl stearate | 2 parts |
| Methyl ethyl ketone | 175 parts |
| Cyclohexanone | 175 parts |
| (3) - Compounding step components | |
| Polyisocyanate | 1 part |
| Methyl ethyl keton | 14.5 parts |
| Cyclohexanone | 14.5 parts |

Among the above components of a magnetic coating composition, the components (1) were kneaded with a batch kneader and the components (2) were added thereto and stirred. The mixture was dispersed in a sand mill in a residence time of 60 minutes. Then, the components (3) were added to the dispersed mixture, stirred and filtrated to prepare a magnetic coating composition for a lapping tape.

On the other surface of the PET film on one surface of which the back layer had been formed, the non-magnetic coating composition was applied so that a resultant non-magnetic layer could have a thickness of 1.2 μm after being dried and calenderd. Then, the magnetic coating composition was applied by a wet-on-wet method so that a resultant magnetic layer could have a thickness of 0.5 μm after being oriented in a magnetic field and dried, oriented in a magnetic filed and dried using a direr and far-infrared ray to obtain a magnetic sheet for a lapping tape. The magnetic sheet was then cut to a width of ½ inch to obtain a lapping tape.

| <Components of Coating Composition of Back layer for Magnetic Tape> | |
|---|---|
| Carbon black (particle size: 25 nm) | 80 parts |
| Carbon black (particle size: 350 nm) | 10 parts |
| α-Iron oxide (particle size: 100 nm) | 10 parts |
| Nitrocellulose | 45 parts |
| Polyurethane resin (containing —SO₃Na groups) | 30 parts |
| Cyclohexanone | 290 parts |
| Toluene | 680 parts |
| Methyl ethyl ketone | 410 parts |

The above components of the coating composition for a back layer were dispersed with a sand mill in a residence time of 45 minutes, and polyisocyanate (15 parts) was added to the mixture, stirred and filtrated to obtain the coating composition for a back layer. Then, the coating composition was applied on one surface of an aromatic polyamide film (non-magnetic support) having a thickness of 3.6 μm ("Mictron®" manufactured by Toray; Young's modulus in machine direction (MD): 11,330 MPa; Young's modulus in transverse direction (TD): 15,380 MPa) so that a resultant back layer could have a thickness of 0.5 μm after being dried and calendered, and then dried to form a back layer.

| <Components of Non-magnetic Coating Composition for Magnetic Tape> | |
|---|---|
| (1) | |
| α-iron oxide (particle size: 110 nm) | 68 parts |
| α-alumina powder (particle size: 70 nm) | 8 parts |
| Carbon black (particle size: 75 nm) | 24 parts |
| Stearic acid | 1 part |
| Vinyl chloride-hydroxypropyl acrylate copolymer (—SO₃Na group content: $0.7 \times 10^{-4}$ eq./g) | 8.8 parts |
| Polyester-polyurethane resin (Tg: 40° C., —SO₃Na group content: $1 \times 10^{-4}$ eq./g) | 4.4 parts |
| Cyclohexanone | 71 parts |
| Methyl ethyl ketone | 120 parts |
| Toluene | 26 parts |
| (2) | |
| Stearic acid | 1 part |
| Butyl stearate | 1 part |
| Cyclohexanone | 20 parts |
| Methyl ethyl ketone | 13 parts |
| Toluene | 20 parts |
| (3) | |
| Polyisocyanate | 1.5 parts |
| Cyclohexanone | 2 parts |
| Methyl ethyl ketone | 15 parts |
| Toluene | 2 parts |

Among the above components of a non-magnetic coating composition, the components (1) were kneaded with a batch kneader, and then the components (2) were added thereto. The mixture was dispersed in a sand mill in a residence time of 60 minutes. Then, the components (3) were added to the dispersed mixture, stirred and filtrated to prepare a non-magnetic coating composition for a magnetic tape.

| <Components of Magnetic Coating Composition for Magnetic Tape> | |
|---|---|
| (1) - Kneading step components | |
| Ferromagnetic iron-based metal powder (Co/Fe: 30 atomic %, Y/(Fe + Co): 6.0 atomic %, Al/(Fe + Co): 3.0 wt. % σs: 155 A·m²/kg, Hc: 193 kA/m, and particle size: 100 nm) | 100 parts |
| Vinyl chloride-hydroxypropyl acrylate copolymer (—SO₃Na group content: $0.7 \times 10^{-4}$ eq./g) | 12 parts |
| Polyester-polyurethane resin (—SO₃Na group content: $1.0 \times 10^{-4}$ eq./g) | 5.5 parts |
| Carbon black (particle diameter: 25 nm) | 2 parts |
| Methyl acid phosphate | 2.5 parts |
| Methyl ethyl ketone | 30 parts |
| Toluene | 12 parts |
| (2) - Dilution step components | |
| α-Alumina slurry (manufactured by Sumitomo Chemical Co. Ltd.; particle diameter of α-alumina: 200 nm; α-alumina content: 45%) | 22 parts |
| n-Butyl stearate | 1 part |
| Palmitic acid amide dispersion (acid amide content: 20%) | 7 parts |
| Cyclohexanone | 110 parts |
| Methyl ethyl ketone | 110 parts |
| Tetrahydrofuran | 30 parts |
| Toluene | 80 parts |
| (3) - Compounding step components | |
| Polyisocyanate | 1.9 parts |
| Methyl ethyl ketone | 12 parts |
| Cyclohexanone | 5 parts |
| Toluene | 5 parts |

Among the above components of a magnetic coating composition, the components (1) were kneaded with a batch kneader and the components (2) were added thereto and stirred. The mixture was dispersed in a sand mill in a residence time of 60 minutes. Then, the components (3) were added to the dispersed mixture, stirred and filtrated through a filter having a pore size of 1.0 μm to prepare a magnetic coating composition for a magnetic tape.

Among the above components of the magnetic coating composition, the palmitic acid amide dispersion was prepared as follows:

Palmitic acid amide (melting point: 107° C.) was dissolved in cyclohexanone while heating to obtain a solution having a solid content of 40% by weight. To the solution, cyclohexanone was added at room temperature to adjust the solid content to 20% by weight, and the diluted solution was dispersed in a sand mill in a residence time of 30 minutes.

On the other surface of the aromatic polyamide film on one surface of which the back layer had been formed, the non-magnetic coating composition was applied so that a resultant non-magnetic layer could have a thickness of 1.0 μm after being dried and calenderd. Then, the magnetic coating composition was applied by a wet-on-wet method so that a resultant magnetic layer could have a thickness of 0.22 μm after being oriented in a magnetic field and dried, oriented in a magnetic filed and dried using a direr and far-infrared ray to obtain a magnetic sheet for a magnetic tape.

The orientation in the magnetic field was carried out by arranging N—N opposed magnets (5 kG) in front of the drier, and arranging, in the drier, two pairs of N—N opposed magnets (5 kG) at an interval of 50 cm and at a position 75 cm before a position where the dryness of the layer was felt by one's fingers. The coating rate was 100 m/min.

The magnetic sheet thus obtained was mirror finished with a seven-stage calender comprising metal rolls, at a temperature of 100° C. under a linear pressure of 245 kN/m, and wound onto a core and aged at 70° C. for 72 hours in a wound form. After that, the magnetic sheet was cut into tapes each having a width of 3.81 mm.

A tape cut from the magnetic sheet was fed at a rate of 200 m/min. while the surface of the magnetic layer of the tape was being polished with a lapping tape and a rotary grinder, and wiped to produce a finished magnetic tape.

As the lapping tape, the lapping tape produced in the above was used. As a rotary grinder, a rotary wheel having air-purge grooves (manufactured by KYOWA SEIKO; wheel width: 1 inch (25.4 mm); wheel diameter: 30 mm; air-purge groove width: 2 mm; number of grooves: 12) was used. To wipe the surface of the magnetic tape, Toraysee® manufactured by Toray was used. The magnetic tape was treated under a feeding tension of 0.39 N.

The magnetic tape having a length of 170 m was set in a cartridge for DDS (digital data storage) to provide a magnetic tape cartridge for evaluation.

Examples 2-4

A magnetic tape was produced in the same manner as in Example 1 except that the components of a primer layer or a magnetic layer and a material of a support shown in Table 1 were used, and the conditions for forming a primer layer or a magnetic layer shown in Table 1 were selected, and then the magnetic tape having a length of 170 m was set in a cartridge for DDS to provide a magnetic tape cartridge for evaluation.

Example 5

A magnetic tape was produced in the same manner as in Example 1 except that ferromagnetic iron-based metal powder (Co/Fe: 30 atomic %; Y/(Fe+Co): 7.9 atomic %; Al/(Fe+Co): 4.7 wt. %; σs: 149 A·m²/kg; Hc: 200 kA/m; particle size: 75 nm) was used as a magnetic powder, the components of a primer layer or a magnetic layer and a material of a support were changed as shown in Table 1 and also the conditions for forming a primer layer and a magnetic layer were changed as shown in Table 1, and then the magnetic tape having a length of 170 m was set in a cartridge for DDS to provide a magnetic tape cartridge for evaluation.

Examples 6-7

A magnetic tape was produced in the same manner as in Example 1 except that the components of a primer layer or a magnetic layer and a material of a support shown in Table 1 were used, and the conditions for forming a primer layer or a magnetic layer shown in Table 1 were selected, and then the magnetic tape having a length of 170 m was set in a cartridge for DDS to provide a magnetic tape cartridge for evaluation.

Examples 8-9

A magnetic tape was produced in the same manner as in Example 1 except that the same ferromagnetic powder as that used in Example 5 was used, the components of a primer layer or a magnetic layer and a material of a support shown in Table 1 were used, and the conditions for forming a primer layer or a magnetic layer shown in Table 1 were selected, and then the magnetic tape having a length of 170 m was set in a cartridge for DDS to provide a magnetic tape cartridge for evaluation.

Comparative Examples 1-7

A magnetic tape of each of Comparative Examples 1-7 was produced in the same manner as in Example 1 except that the components of a primer layer or a magnetic layer and a material of a support shown in Table 2 were used, and the conditions for forming a primer layer or a magnetic layer shown in Table 2 were selected, and then the magnetic tape having a length of 170 m was set in a cartridge for DDS to provide a magnetic tape cartridge for evaluation.

In Examples 1 to 9 and Comparative Examples 1 to 7 reported in Tables 1 and 2, respectively, the fatty acid amides to be contained in the magnetic layer or the primer layer were used in the form of a powder, or in the form of a dispersion.

The dispersion of the fatty acid amide other than palmitic acid amide was prepared in the same manner as in Example 1.

In Examples 1 to 9 and Comparative Examples 1 to 7, an aromatic polyamide film was used as a non-magnetic support. The thickness and the Young's moduli in the machine and transverse directions of the film were set as shown in the Tables.

In the Tables, the abbreviations of fatty acid amides have the following meanings:
Pa amide: Palmitic acid amide
St amide: Stearic acid amide
Ol amide: Oleic acid amide
Ec amide: Eicosanoic acid amide.

The thicknesses of the primer layer, magnetic layer and back layer, and the Young's moduli in the machine and transverse directions ($E_{MD}$ and $E_{TD}$) of the magnetic tape and the non-magnetic support were measured as described below.

The materials of the primer layer and magnetic layer, and the forming methods of these two layers as well as the properties of the magnetic tapes including the thicknesses of the layers and the Young's moduli are summarized in the Tables.

Measurement of layer thickness:

A magnetic tape was buried in a resin and cut with a diamond cutter (or a focused ion beam processor). Then, 50 different samples of the cut planes were photographed with a transmission electron microscope (TEM) at a magnification of 10,000 times, and the interfaces between the magnetic layer and the non-magnetic (primer) layer, between the non-magnetic layer and the non-magnetic support and between the non-magnetic support and the back layer were rimmed. Then, the distance between the rimming lines was measured at five points which were arbitrarily selected from each photograph and averaged to calculate the thickness of the primer layer, the magnetic layer or the back layer.

Measurement of Young's moduli in machine and transverse directions:

Using a compact size tensile tester (manufactured by YOKOHAMA SYSTEM), a strain and a tensile stress of a magnetic tape were measured at a temperature of 23° C. and a humidity of 50% RH. The sample of 10 mm long was pulled at a pulling rate of 10% strain/min., and then a Young's modulus at 0.3% elongation was measured based on the stress measured at 0.3% strain. This measurement was carried out in the machine and transverse directions of the magnetic tape.

This measurement is preferably carried out with a sample cut out from the magnetic sheet which has not been cut to produce a magnetic tape. Alternatively, this measurement can be carried out using a magnetic tape by the following method:

A sample magnetic tape is cut to prepare a rectangular sample having sizes of 3.81 mm in the transverse direction and of about 1 mm in the machine direction. One edge of the sample along with the machine direction was pinched with a vibration part of a vibration exciter and vibrated in the plane direction. While a vibration frequency is changed from a lower frequency to a higher frequency, the vibration of the other end of the sample is measured with a non-contact type displacement gauge. A resonance frequency at which the amplitude of vibration is maximized is read and a Young's modulus in the transverse direction ($E_{TD}$: kg/mm$^2$) is calculated according to the following formula:

$$E_{TD} = a \times [(\rho \times L^4)/t^2] \times f_{TD}$$

in which a is a constant (=3.83), $\rho$ is a density of a tape (g/cm$^3$), L is a length of a vibrated part of a tape sample (mm), t is a thickness of a magnetic tape (mm), and $f_{TD}$ is a resonance frequency (Hz).

Similarly, a rectangular sample having sizes of about 4 mm in the machine direction and of about 1 mm in the transverse direction is cut out from a sample magnetic tape, and set on the vibration exciter. Then, a resonance frequency $f_{MD}$ is read analogously. Thus, $E_{MD}/E_{TD}$ can be calculated by the formula:

$$E_{MD}/E_{TD} = f_{MD}/f_{TD}$$

From this result, a Young's modulus in the transverse direction can be calculated from the Young's modulus in the machine direction measured using the tensile tester.

Furthermore, with the magnetic tapes for evaluation produced in Examples 1 to 9 and Comparative Examples 1 to 7, a reproducing output, an error rate and its increase rate and a tape-type interchangeability and an extracted amount of a fatty acid amide were measured as follows:

Reproducing output:

Using a DAT 72 drive (manufactured by Hewlett-Packard), a reproducing output was measured by recording and reproducing a signal having a recording wavelength of 0.50 μm. The measured outputs are shown in the Tables, in which the output measured with the magnetic tape of Comparative Example 1 was defined as 0 dB and the outputs of the magnetic tapes of other Examples were reported in terms of a relative value to this 0 dB.

Error rate and increase rate of error rate:

Using a DAT 72 drive (manufactured by Hewlett-Packard), 100 MB of random digital signals having a recording wavelength of 0.5 μm were recorded and reproduced at a recording track width of 5.4 μm, and C1 errors (correctable errors) detected during the reproduction step were counted. An error rate (ERT) was expressed by a ratio of the number of C1 errors to the number of recorded signals.

To evaluate an increase rate of the error rate, an error rate before running of a magnetic tape and also an error rate after continuous running of the magnetic tape for 96 hours at a temperature of 40° C. and a humidity of 20% RH were measured. An increase rate of the error rate was expressed by a ratio of an error rate after running to that before running.

Tape-type interchangeability:

Using a DAT 72 drive (manufactured by Hewlett-Packard), an output of each sample magnetic tape was measured at a recording wavelength of 0.50 μm. A commercially available magnetic tape of DDS3 was reciprocally run 5 times with recording and reproducing the signals. Thereafter, the output of the sample magnetic tape was again measured, and the decrease of the output after tape interchanging was calculated as a difference between the original output and the output after the running of the commercially available DDS3 tape, and used as criteria for evaluating the tape-type interchangeability.

Extracted amount of fatty acid amide:

A sample magnetic tape from which a back layer was removed with tetrahydrofuran was treated with ultrasonic wave of 40 kHz in n-hexane at 25° C. for 30 minutes to extract a fatty acid amide. Then, the amount of the fatty acid amide in the extract (n-hexane) was measured by gas chromatography.

The measured amount of the fatty acid amide was converted to an amount per unit volume of the coating layer (primer layer+magnetic layer) of the sample magnetic tape.

The volume of the coating layer was calculated by the formula:

(Length of sample tape)×(Width of sample tape)× (Thickness of coating layer on magnetic layer side).

Here, the thickness of the coating layer on the magnetic layer side was measured as follows:

The whole thickness of a single magnetic tape was obtained by piling ten pieces of the tape, measuring the thickness of the piled pieces with a micrometer and then dividing the measured thickness by 10 (ten). Separately, the thickness of the tape consisting of the support and the back layer having no coating layer was obtained by removing the coating layer on the magnetic layer side with tetrahydrofuran, piling ten pieces of the tape having no coating layer, measuring the thickness of the piled pieces with a micrometer and then dividing the measured thickness by 10 (ten). Then, a different of the whole thickness of the magnetic tape and the thickness of the tape consisting of the support and the back layer having no coating layer was calculated. The obtained value was the thickness of the coating layer.

The results of the evaluations are summarized in Tables 1 and 2.

TABLE 1

| | | Example No. | | | | | | | | |
|---|---|---|---|---|---|---|---|---|---|---|
| | | 1 | 2 | 3 | 4 | 5 | 6 | 7 | 8 | 9 |
| Primer layer | Thickness (μm) | 1.0 | 0.85 | 0.85 | 1.0 | 0.7 | 1.1 | 1.0 | 0.6 | 0.7 |
| | Stearic acid amide (parts) | 0 | 0 | 0 | 0 | 0 | 0 | 0.1 | 0 | 0 |
| | Timing of addition of stearic acid amid*) | — | — | — | — | — | — | After | — | — |
| | Pre-treatment of fatty acid amide | — | — | — | — | — | — | Powder | — | — |
| | Stearic acid (parts) | 1.0 | 1.0 | 1.0 | 1.0 | 1.0 | 1.0 | 1.0 | 1.0 | 1.0 |
| | Butyl stearate (parts) | 1.0 | 1.0 | 1.0 | 0.8 | 1.6 | 1.0 | 1.0 | 0.8 | 1.6 |
| | Dispersing time (minutes) | 60 | 60 | 60 | 60 | 90 | 60 | 60 | 90 | 90 |

TABLE 1-continued

|  |  | Example No. | | | | | | | | |
|---|---|---|---|---|---|---|---|---|---|---|
|  |  | 1 | 2 | 3 | 4 | 5 | 6 | 7 | 8 | 9 |
| Magnetic layer | Thickness (μm) | 0.22 | 0.25 | 0.25 | 0.25 | 0.25 | 0.19 | 0.28 | 0.15 | 0.25 |
|  | Major axis length of magnetic powder (μm) | 0.1 | 0.1 | 0.1 | 0.1 | 0.075 | 0.1 | 0.1 | 0.075 | 0.075 |
|  | Particle size of alumina (μm) | 0.2 | 0.2 | 0.2 | 0.2 | 0.2 | 0.2 | 0.2 | 0.1 | 0.2 |
|  | Butyl stearate (parts) | 1.0 | 1.0 | 1.0 | 0.6 | 1.0 | 1.0 | 1.0 | 1.0 | 1.0 |
|  | Dispersing time (minutes) | 60 | 60 | 60 | 60 | 100 | 60 | 60 | 100 | 100 |
|  | Calendering linear pressure (kN/m) | 245 | 245 | 245 | 245 | 294 | 245 | 245 | 294 | 294 |
|  | Fatty acid amide (parts) | 1.2 | 1.4 | 0.6 | 1.3 | 0.9 | 1.6 | 1.6 | 1.0 | 2.0 |
|  | Extracted amount of fatty acid amide (mg/cm$^3$) | 1.2 | 1.5 | 0.53 | 1.4 | 1.3 | 1.3 | 0.5 | 0.9 | 1.1 |
|  | Kind of fatty acid amide | Pa amide | Pa amide | Pa amide | Pa amide | St amide | Pa amide | Ol amide | Ec amide | Ec amide |
|  | Melting point of fatty acid amide (° C.) | 107 | 107 | 107 | 107 | 110 | 107 | 76 | 69 | 69 |
|  | Timing of addition of fatty acid amide*) |  | Before |  |  |  | Before | After | Before | After |
|  | Pre-treatment of fatty acid amide |  | Dispersion |  |  |  | Powder | Dispersion | Dispersion | Powder |
| Support | Thickness (μm) | 3.60 | 3.60 | 3.60 | 3.60 | 2.60 | 3.60 | 3.30 | 3.00 | 2.60 |
|  | $E_{MD}$ (×10$^3$ MP) | 11.3 | 11.3 | 11.3 | 14.5 | 8.1 | 12.6 | 11.3 | 10.3 | 8.1 |
|  | $E_{TD}$ (×10$^3$ MP) | 15.7 | 15.7 | 15.7 | 12.5 | 18.9 | 14.4 | 15.7 | 20.5 | 18.8 |
|  | $E_{MD}/E_{TD}$ | 0.72 | 0.72 | 0.72 | 1.16 | 0.43 | 0.88 | 0.72 | 0.50 | 0.43 |
| Magnetic tape | Thickness (μm) | 5.32 | 5.20 | 5.20 | 5.35 | 4.00 | 5.39 | 5.08 | 4.25 | 4.00 |
|  | $E_{MD}$ (×10$^3$ MP) | 12.2 | 12.3 | 12.3 | 15.5 | 8.0 | 13.5 | 12.5 | 11.4 | 9.5 |
|  | $E_{TD}$ (×10$^3$ MP) | 16.1 | 16.6 | 16.9 | 12.5 | 17.6 | 15.8 | 16.3 | 20.9 | 19.4 |
|  | $E_{MD}/E_{TD}$ | 0.76 | 0.74 | 0.73 | 1.24 | 0.45 | 0.85 | 0.77 | 0.55 | 0.49 |
|  | $E_{TD} \cdot t^3$ | 2.42 | 2.33 | 2.38 | 1.91 | 1.23 | 2.47 | 2.14 | 1.60 | 1.24 |
| Tape property | Output (dB) | 2.0 | 1.5 | 1.5 | 1.0 | 0.2 | 1.5 | 1.7 | 0.7 | 0.1 |
|  | Increase rate of error rate | 1.1 | 1.6 | 2.4 | 2.0 | 2.8 | 2.8 | 3.2 | 4.4 | 5.0 |
|  | Output deterioration (dB) | 2.2 | 2.2 | 2.1 | 1.3 | 1.0 | 1.9 | 1.9 | 2.0 | 1.8 |
|  | Output decrease after tape interchange (dB) | 0.0 | 0.0 | 0.1 | 0.9 | 1.2 | 0.35 | 0.3 | 0.2 | 0.45 |

Note:
*)"Before" and "After" mean that a fatty acid amide was added before and after the dispersing.

TABLE 2

|  |  | Comparative Example No. | | | | | | |
|---|---|---|---|---|---|---|---|---|
|  |  | 1 | 2 | 3 | 4 | 5 | 6 | 7 |
| Primer layer | Thickness (μm) | 0.6 | 1.0 | 1.0 | 1.0 | 0.5 | 1.0 | 0.7 |
|  | Stearic acid amide (parts) | 0 | 0 | 0 | 0 | 0 | 0 | 0.2 |
|  | Timing of addition of stearic acid amid*) | — | — | — | — | — | — | After |
|  | Pre-treatment of fatty acid amide | — | — | — | — | — | — | Powder |
|  | Stearic acid (parts) | 1.0 | 1.0 | 1.0 | 1.0 | 1.0 | 1.0 | 0.4 |
|  | Butyl stearate (parts) | 1.0 | 1.0 | 1.0 | 1.0 | 1.0 | 1.0 | 0.8 |
|  | Dispersing time (minutes) | 60 | 60 | 60 | 60 | 90 | 60 | 60 |
| Magnetic layer | Thickness (μm) | 0.15 | 0.25 | 0.22 | 0.22 | 0.15 | 0.22 | 0.18 |
|  | Major axis length of magnetic powder (μm) | 0.1 | 0.1 | 0.1 | 0.1 | 0.1 | 0.1 | 0.1 |
|  | Particle size of alumina (μm) | 0.1 | 0.2 | 0.2 | 0.2 | 0.1 | 0.15 | 0.2 |
|  | Butyl stearate (parts) | 1.0 | 1.0 | 1.0 | 1.0 | 0.6 | 1.0 | 0.8 |
|  | Dispersing time (minutes) | 60 | 60 | 60 | 60 | 60 | 60 | 60 |
|  | Calendering linear pressure (kN/m) | 245 | 245 | 245 | 245 | 245 | 245 | 245 |
|  | Fatty acid amide (parts) | 1.2 | 0.45 | 1.6 | 1.6 | 0.4 | 1.3 | 0.2 |
|  | Extracted amount of fatty acid amide (mg/cm$^3$) | 0.4 | 0.40 | 1.4 | 1.4 | 1.5 | 1.4 | 0.4 |
|  | Kind of fatty acid amide | Ec amide | Pa amide | Pa amide | Ec amide | Pa amide | Pa amide | St amide |
|  | Melting point of fatty acid amide (° C.) | 69 | 107 | 107 | 69 | 107 | 107 | 110 |
|  | Timing of addition of fatty acid amide*) | After | Before | Before | Before | Before | Before | After |
|  | Pre-treatment of fatty acid amide | Powder | Dispersion | Dispersion | Dispersion | Dispersion | Dispersion | Powder |
| Support | Thickness (μm) | 2.60 | 3.60 | 3.60 | 3.60 | 2.80 | 3.90 | 3.90 |
|  | $E_{MD}$ (×10$^3$ MP) | 10.3 | 11.3 | 11.3 | 11.3 | 8.1 | 11.3 | 11.3 |
|  | $E_{TD}$ (×10$^3$ MP) | 20.5 | 16.0 | 15.7 | 15.7 | 19.0 | 15.67 | 15.7 |
|  | $E_{MD}/E_{TD}$ | 0.50 | 0.71 | 0.72 | 0.72 | 0.43 | 0.72 | 0.72 |
| Magnetic tape | Thickness (μm) | 3.85 | 5.35 | 5.32 | 5.32 | 3.95 | 5.62 | 5.28 |
|  | $E_{MD}$ (×10$^3$ MP) | 10.4 | 11.9 | 11.8 | 11.9 | 9.0 | 12.9 | 12.3 |
|  | $E_{TD}$ (×10$^3$ MP) | 21.2 | 17.2 | 16.3 | 16.2 | 20.0 | 16.6 | 16.2 |
|  | $E_{MD}/E_{TD}$ | 0.49 | 0.69 | 0.72 | 0.73 | 0.45 | 0.77 | 0.76 |
|  | $E_{TD} \cdot t^3$ | 1.26 | 2.63 | 2.45 | 2.44 | 1.23 | 2.95 | 2.38 |

TABLE 2-continued

| | | Comparative Example No. | | | | | | |
|---|---|---|---|---|---|---|---|---|
| | | 1 | 2 | 3 | 4 | 5 | 6 | 7 |
| Tape property | Output (dB) | 0.0 | 0.5 | 1.8 | 2.2 | −1.5 | Tape could not be wound for 170 m | 1.7 |
| | Increase rate of error rate | 100 | 24 | 13 | 29 | 69 | | 16 |
| | Output deterioration (dB) | 0.0 | 2.2 | 2.0 | 1.8 | −0.1 | | 0.2 |
| | Output decrease after tape interchange (dB) | 2.2 | 0.0 | 0.2 | 0.3 | 2.3 | | 2.0 |

Note:
*)"Before" and "After" mean that a fatty acid amide was added before and after the dispersing.

As can be seen from the results reported in Tables 1 and 2, the magnetic tapes of Examples 1 to 9 according to the present invention had a larger recording capacity per reel and better electromagnetic conversion characteristics, reliability and durability than the comparative magnetic tapes of Comparative Examples 1 to 7, even when the total thickness of the magnetic tape was made small. In addition, the magnetic tapes of Examples 1 to 9 according to the present invention had good tape type interchangeability.

What is claimed is:

1. A magnetic tape comprising a non-magnetic support, a primer layer formed on one surface of said support and containing a non-magnetic powder and a binder, a magnetic layer formed on said primer layer and containing a magnetic powder and a binder, and a back layer formed on the other surface of said support, wherein said tape has a total thickness of 4.0 to 5.4 μm, at least one of said primer layer and said magnetic layer contains a fatty acid amide, an amount of the fatty acid amide extracted from the side of the magnetic layer with n-hexane is from 0.5 to 1.5 mg/cm$^3$, said fatty acid amide has a melting point of at least 70° C., and $E_{TD} \cdot t^3$ is at least $2.0 \times 10^{-6}$ N·m, and $E_{MD}/E_{TD}$ is larger than 0.5 and less than 0.9, in which $E_{MD}$ and $E_{TD}$ are the Young's moduli (unit: Pa) of a magnetic tape in the machine and transverse directions of said magnetic tape, respectively and t is a thickness (unit: μm) of said magnetic tape.

2. A method for producing the magnetic tape of claim 1, said method comprising adding the fatty acid amide to at least one of a non-magnetic coating composition of a primer layer and a magnetic coating composition for a magnetic layer.

3. The method according to claim 2, wherein said fatty acid amide is added to said at least one of the coating compositions in the form of a dispersion in an organic solvent.

4. The method according to claim 2, wherein said fatty acid amide is added to said at least one of the coating compositions before said coating composition is dispersed.

5. The magnetic tape according to claim 1, wherein the fatty acid amide is added to the magnetic layer.

6. The magnetic tape according to claim 1, wherein the fatty acid amide is selected from the group consisting of lauric acid amide, myristic acid amide, palmitic acid amide, stearic acid amide and oleic acid amide.

7. A magnetic tape comprising a non-magnetic support, a primer layer formed on one surface of said support and containing a non-magnetic powder and a binder, a magnetic layer formed on said primer layer and containing a magnetic powder and a binder, and a back layer formed on the other surface of said support, wherein said tape has a total thickness of 4.0 to 5.4 μm, at least one of said primer layer and said magnetic layer contains at least one fatty acid amide selected from the group consisting of lauric acid amide, myristic acid amide, palmitic acid amide, stearic acid amide and oleic acid amide, an amount of the fatty acid amide extracted from the side of the magnetic layer with n-hexane is from 0.5 to 1.5 mg/cm$^3$, said fatty acid amide has a melting point of at least 70° C., and wherein $E_{TD} \cdot t^3$ is at least $2.0 \times 10^{-6}$ N·m, and $E_{MD}/E_{TD}$ is larger than 0.5 and less than 0.9, in which $E_{MD}$ and $E_{TD}$ are the Young's moduli (unit: Pa) of a magnetic tape in the machine and transverse directions of said magnetic tape, respectively and t is a thickness (unit: μm) of said magnetic tape.

* * * * *